United States Patent [19]
Yamamoto et al.

[11] Patent Number: 5,361,135
[45] Date of Patent: Nov. 1, 1994

[54] MAGNETIC TAPE RECORDING AND REPRODUCING APPARATUS FOR DIGITAL SIGNALS OF STILL PICTURES IN THE PAL SYSTEM

[75] Inventors: Hirotoshi Yamamoto; Yukihiko Haikawa, both of Higashihiroshima, Japan

[73] Assignee: Sharp Kabushiki Kaisha, Osaka, Japan

[21] Appl. No.: 909,201

[22] Filed: Jul. 6, 1992

[30] Foreign Application Priority Data

Jul. 12, 1991 [JP] Japan .................................. 3-172743

[51] Int. Cl.$^5$ .............................................. H04N 5/76
[52] U.S. Cl. .................................. 358/335; 358/313; 348/441
[58] Field of Search ............... 358/312, 313, 310, 335, 358/342, 324, 327, 11, 140, 21 R; 360/11.1, 10.1

[56] References Cited

U.S. PATENT DOCUMENTS

| | | | |
|---|---|---|---|
| 4,283,736 | 8/1981 | Morio et al. | 358/4 |
| 4,288,810 | 9/1981 | Drewery et al. | 358/16 |
| 4,430,675 | 2/1984 | Fujime | 358/342 |
| 4,788,604 | 11/1988 | Takeuchi | 360/10.3 |
| 4,816,929 | 3/1989 | Bradley et al. | 360/10.1 |
| 5,031,040 | 7/1991 | Maruyama | 358/140 |
| 5,063,437 | 11/1991 | Owashi et al. | 358/22 |

FOREIGN PATENT DOCUMENTS

| | | | |
|---|---|---|---|
| 0238232 | 9/1987 | European Pat. Off. | H04N 5/04 |
| 0338812 | 10/1989 | European Pat. Off. | H04N 1/21 |
| 0349989 | 1/1990 | European Pat. Off. | H04N 9/87 |
| 64-69178 | 3/1989 | Japan . | |

Primary Examiner—Tommy P. Chin
Assistant Examiner—Robert Chevalier
Attorney, Agent, or Firm—Nixon & Vanderhye

[57] ABSTRACT

To record and reproduce appropriately video signals of PAL system as still picture in a magnetic tape recording and reproducing apparatus. As still picture data, video signals for one field or two fields of PAL system recorded in a magnetic tape after once stored in memories at the time of recording are read out when reproducing and stored simultaneously once in the memories. When storing the still picture data for one field, the still picture data of one field, and the still picture data for one false field which excludes the data of specific scanning lines from the still picture data are repeatedly read out from the memories. When storing the still picture data for two fields, the still picture data for the two fields, and the still picture data for two false fields which excludes the data in specific scanning lines from the still picture data are repeatedly read out from the memories, so that the number of scanning lines in phase face to face in the still picture data may be an even number.

6 Claims, 8 Drawing Sheets

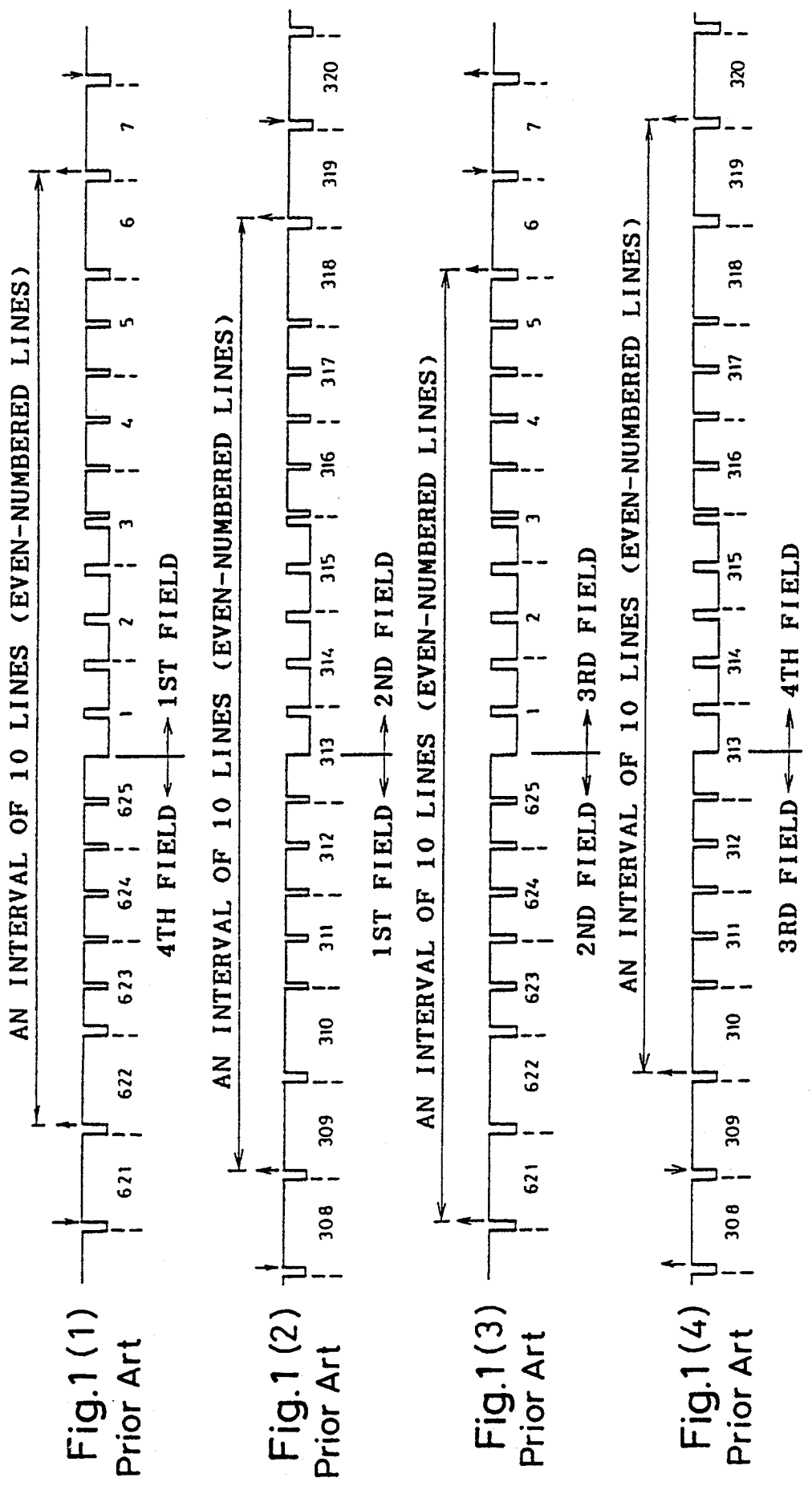

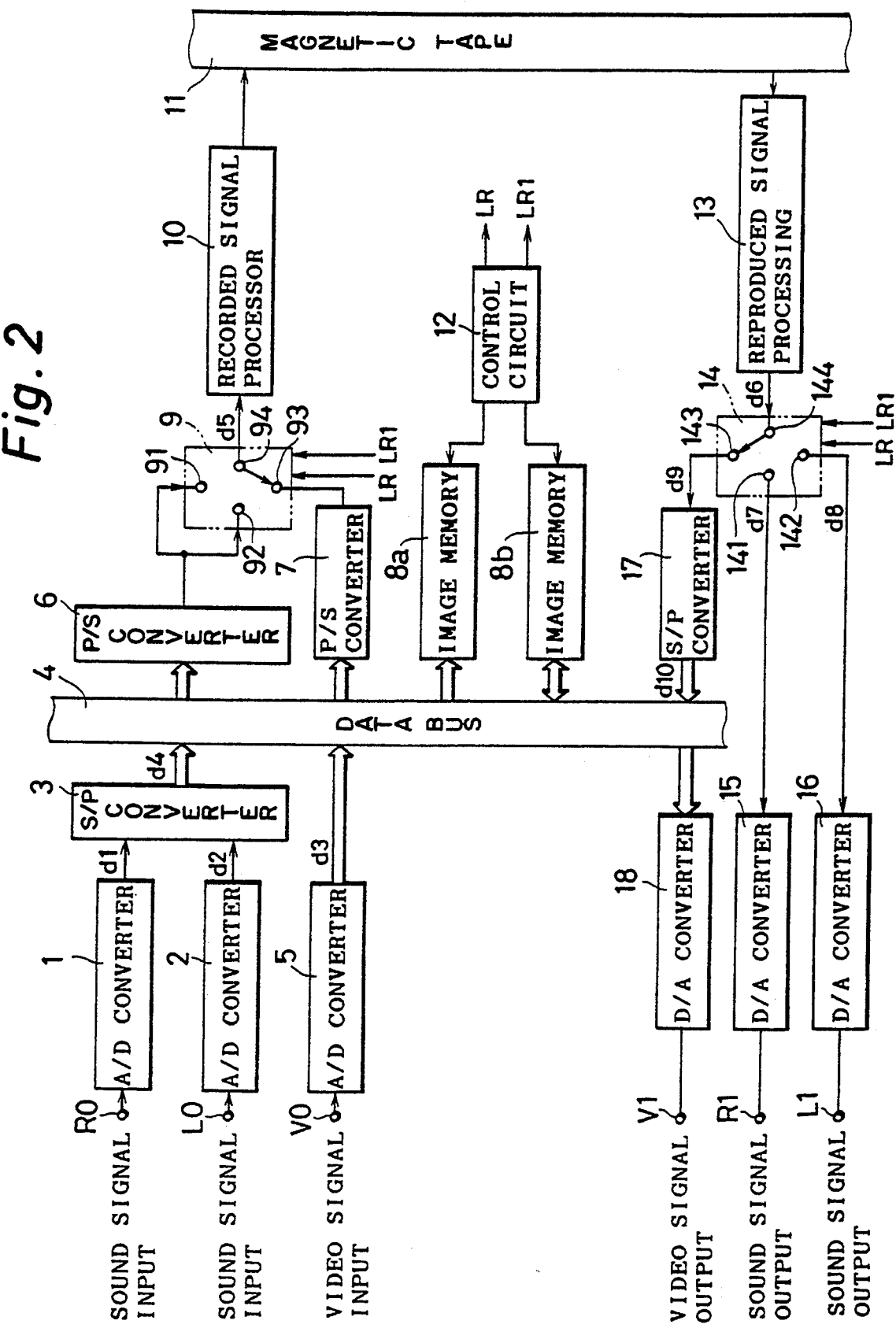

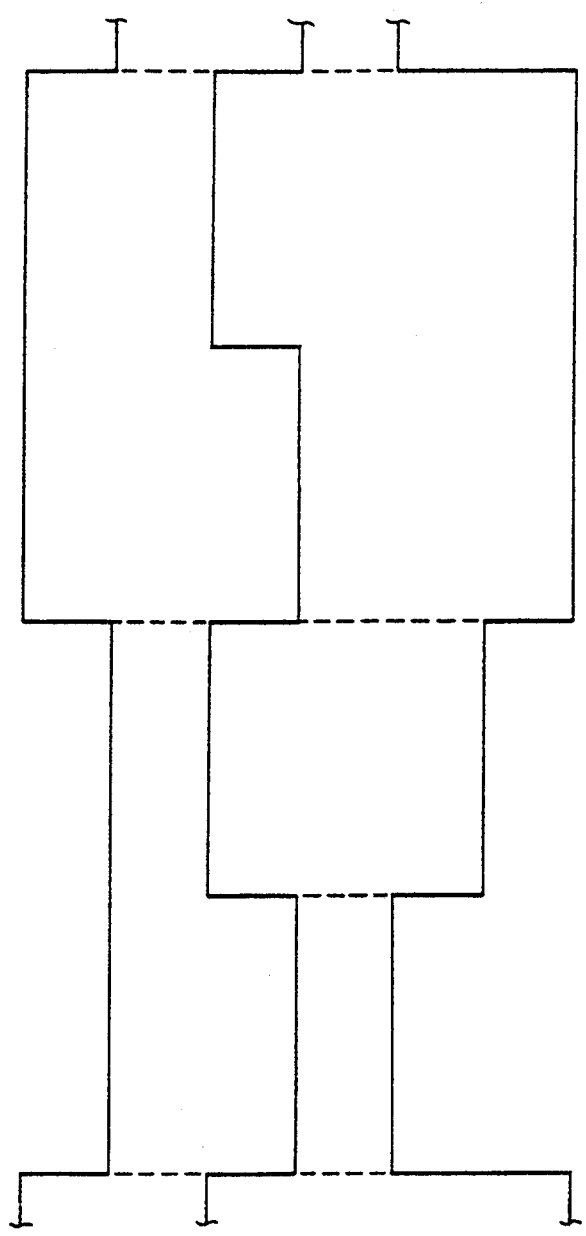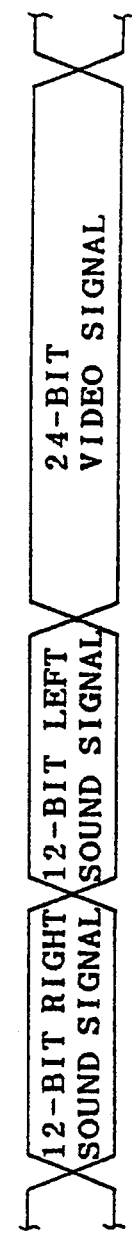
Fig.3(1) LR
Fig.3(2) LR1
Fig.3(3) SWITCH 9(14) 91(141) 92(142) 93(143)
Fig.3(4) DATA

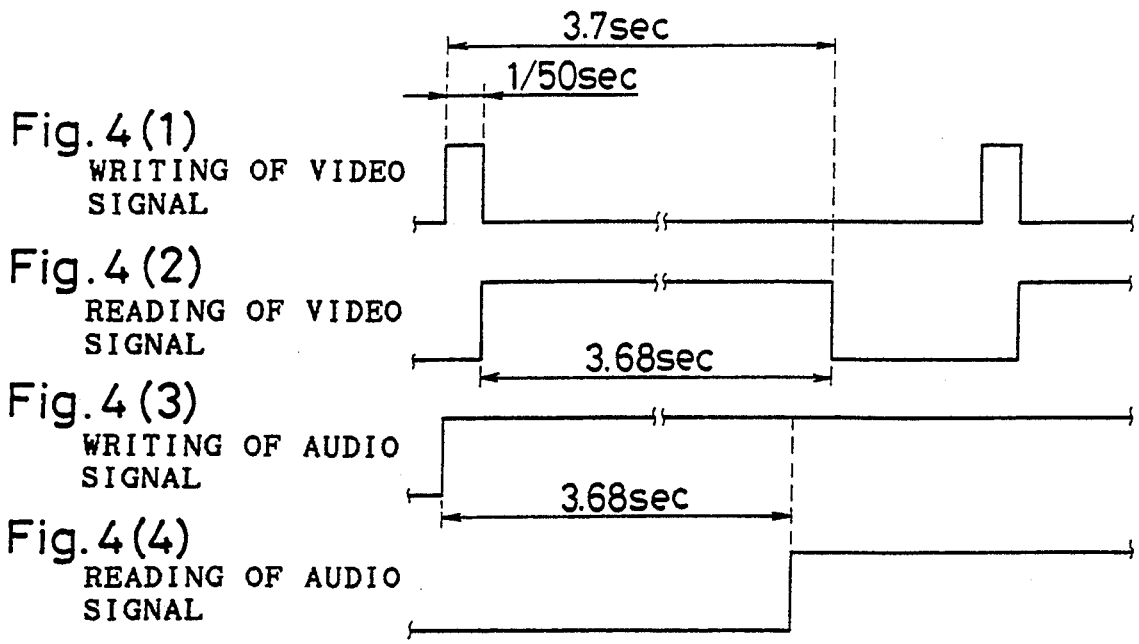
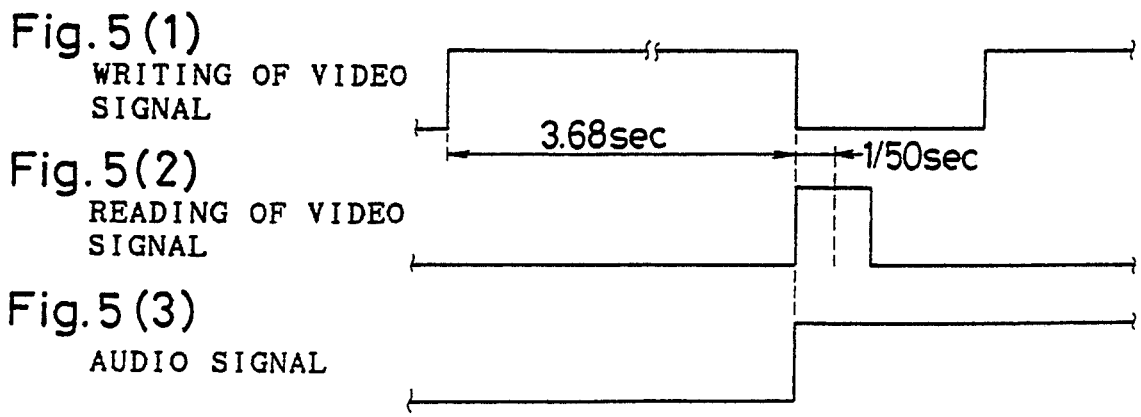

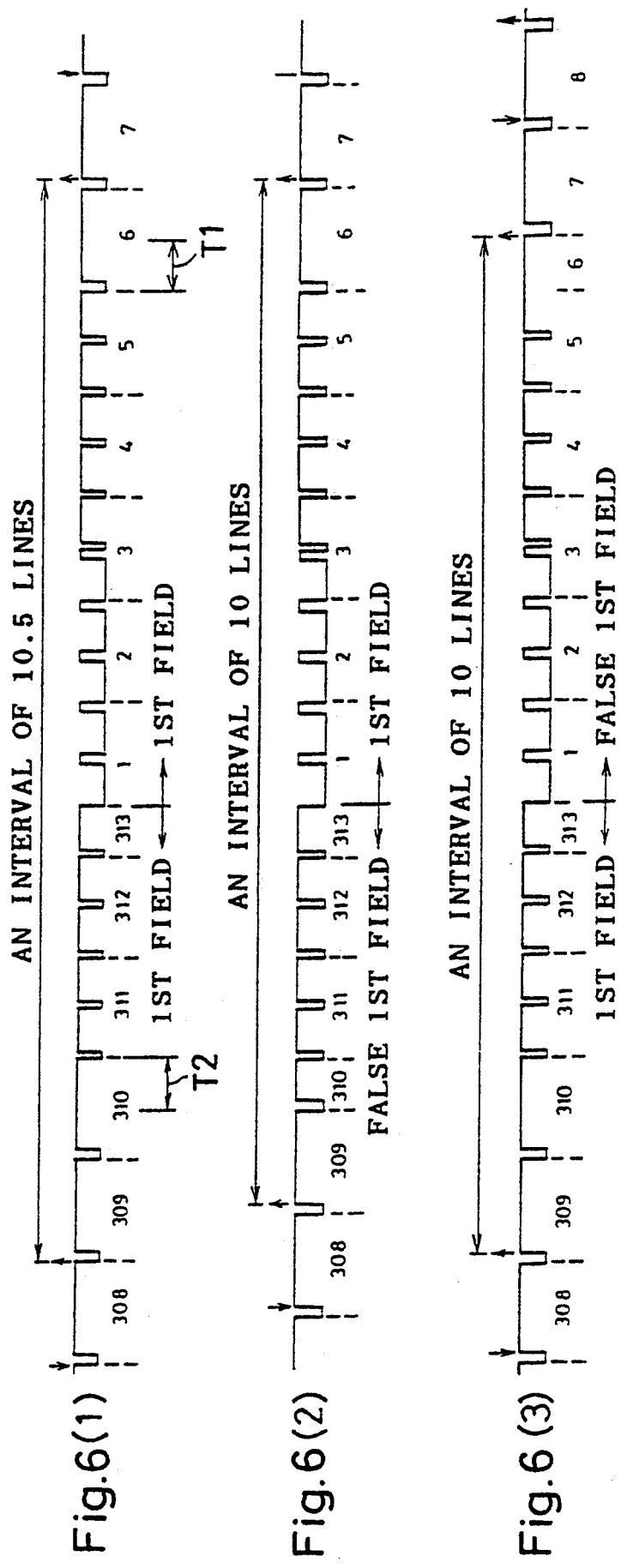

MAGNETIC TAPE RECORDING AND REPRODUCING APPARATUS FOR DIGITAL SIGNALS OF STILL PICTURES IN THE PAL SYSTEM

BACKGROUND OF THE INVENTION

1. Field of the Invention

The present invention relates to magnetic tape recording and reproducing apparatus for recording and reproducing digital signals of still picture data by using a magnetic tape as recording medium.

2. Description of the Related Art

One of the recording and reproducing apparatuses, hitherto known is a digital recording and reproducing apparatus for converting a sound signal into a digital signal, recording it into a magnetic tape, and converting the digital signal recorded in the magnetic tape back to the sound signal, and reproducing it.

In the case of this digital recording and reproducing apparatus, when converting the sound signal into a digital signal and recording into the magnetic tape, the information for correction of error can be simultaneously recorded as subsidiary information, and therefore if a part of the recorded information is missing. The missing portion can be reconstructed, and therefore the original sound can be reproduced at high fidelity, and reproduction of sound at an extremely low noise level is realized at the same time.

In such conventional digital recording and reproducing apparatus, in certain products, it is allowed to select, as its mode of action, either the two-channel mode for setting two channels for individually recording two types of sound signal in the magnetic tape, or the four-channel mode for setting four channels for individually recording four types of sound signal in the magnetic tape.

Of them, in the two-channel mode, two types of sound signals corresponding to two speakers located at the front left side and front right side of the listener are recorded in the magnetic tape, while in the four-channel mode, four types of sound signals corresponding to four speakers located at the front left side, front right side, rear left side and rear right side of the listener are recorded.

Additionally, in the case of the four-channel model, it has been also known hitherto to record sound signals in two channels, and still picture video signals in the remaining two channels, so as to reproduce the sound signal and video signal simultaneously from one magnetic tape.

In this system, for example, image memories are prepared to record the still picture video signals of one screen, and when recording, the video signals for one screen are converted into digital signals in an analog-to-digital (A/D) converter before being recorded in the magnetic tape, and are sequentially written once in one of the two image memories, and then the digital video signals for one screen are read out from the image memory, and recorded in two channels of the magnetic tape.

At this time, the sound signals supplied parallel to the video signal are also converted into digital signals in another D/A converter, and are sequentially written into the remaining image memories, and read out and recorded in the magnetic tape. As a result, in the magnetic tape, the video signals for one screen, and the narration or other sound signals corresponding to the screen are recorded simultaneously.

When reproducing, on the other hand, the digital video signals for one screen being read out from the magnetic tape are once written sequentially into one of the image memories, and after completion of writing, the video signals for that one screen are sequentially read out from that image memory, and the video signals being read out are converted back to the original analog video signals in a digital-to-analog (D/A) converter, and reproduced.

At this time, also, parallel to the digital video signals, the digital sound signals are read out from the magnetic tape and are converted into analog sound signals in D/A converter, and reproduced. As a result, when the still picture video signals for one screen are reproduced, the narration or other sound signals corresponding to the still picture are reproduced simultaneously.

In such conventional digital recording and reproducing apparatus, it does not matter when recording and reproducing video signals and sound signals of the NTSC (National Television System Committee) system are used as still picture data, but the following problems occur when recording and reproducing the video signals of the PAL (Phase Alternation by Line) system.

The phase repetition characteristic of the scanning lines in the video signals of PAL system is as follows: supposing the beginning of the first field, or the first scanning line to be in positive phase, the end of the first field, or the first half of the 313th scanning line is in positive phase, and the beginning of the second field, or the second half of the 313th scanning line is also in positive phase, and the end of the second field, or the 625th scanning line is also in positive phase.

Accordingly, the first scanning line of the third field begins at negative phase, and the end of the third field, or the first half of the 313th scanning line is in negative phase, the beginning of the fourth field, or the second half of the 313th scanning line is in negative phase, and the end of the fourth field, or the 625th scanning line is also in negative phase.

In order to record and reproduce the video signal of the PAL system correctly as still picture data, it is necessary to record continuous video signals for at least four fields as one unit as shown in FIG. 1. More specifically, when repetitively reproducing the continuous video signals for four fields, the number of scanning lines of the scanning line period (from the 622nd scanning line to the seventh scanning line) in phase face to face across the vertical synchronizing signal portion in the section from the last portion of the video signals of the fourth field until the first portion of the video signals of the next first field shown in FIG. 1(1) is 10, the number of scanning lines of the scanning line period (from the 309th scanning line to the 319th scanning line) in phase face to face across the vertical synchronizing signal portion in the section from the last portion of the video signals of the first field to the first portion of the video signals of the next second field shown in FIG. 1(2) is 10, the number of scanning lines of the scanning line period (from the 621st scanning line to the sixth scanning line) in phase face to face across the vertical synchronizing signal portion in the section from the last portion of the video signals of the second field until the first portion of the video signals of the next third field shown in FIG. 1(3) is 10, and the number of scanning lines of the scanning line period (from the 310th scanning line of the 320th scanning line) in phase face to face across the vertical synchronizing signal portion in the section from the last portion of the video signals of the third field until the first portion of the video signals of the next fourth field shown in FIG. 1(4) is also 10.

Therefore, in the conventional digital recording and reproducing apparatus, regarding the image memories for temporarily storing the still picture video signals before recording on the magnetic tape, only image memories of memory capacity for one screen, that is, two field are prepared, and when recorded and reproduced by taking in one screen portion of the video signals of the PAL system in this digital recording and reproducing apparatus, the phases of the scanning lines are matched on each screen, but the reproduced still picture is not colored, and other adverse effects are also brought about.

Additionally although, the method of converting the video signals of the PAL system into compound signals of the luminance signal and color difference signals, and writing into the image memories may be considered as a measure for solving the above problems, it requires complicated converting circuits, and it leads to new problems such as increase of cost.

SUMMARY OF THE INVENTION

It is therefore a primary object of the invention to present a magnetic tape recording and reproducing apparatus capable of recording and reproducing video signals of the PAL system appropriately as still picture data without requiring complicated circuits.

To achieve the object, the invention presents a magnetic tape recording and reproducing apparatus for recording and reproducing digital signals of still picture data by using a magnetic tape as recording medium, comprising:

a memory possessing a capacity for storing the portion of at least one field or two fields of the video signals which in two fields compose one screen, means for recording by storing the video signals of the PAL system for the portion of one field or two fields in the memory as still picture data, and recording in the magnetic tape by reading out sequentially from the memory, and means for reproducing by reading out the recorded still picture data of one field or two fields of the magnetic tape when reproducing and storing in the memory together, reading out repeatedly, if the recorded still picture data are for one field, the still picture data of the one field, along with the still picture data of the false one field which excludes a data of the specific scanning line section out of the still picture data, sequentially from the memory, or reading out repeatedly, if the recorded still picture data are for two fields, the still picture data of the two fields, and the still picture data of two false fields which excludes the data of specific scanning line sections out of the still picture data, sequentially from the memory, and producing the still picture data of which the number of scanning lines in the scanning line that are of the same phase existing across the vertical synchronizing signal of the still picture data (hereinafter period in phase face to face, is an even number.

According to the invention, the video signals of the portion of one field or two fields of the PAL system recorded in a magnetic tape after storing in the memory when recording as the still picture data are read and stored in the memory at the time of reproduction. When the still picture data for one field are stored, the still picture data of the one field as stored, and the still picture data for a false field excluding the data of a specific scanning line section from the still picture data of one field are sequentially read out from the memory, or when the still picture data for two fields are stored, the still picture data for two fields as stored, and the still picture data for two false fields which exclude the data of a specific scanning line section from the still picture data for two fields are sequentially read out from the memory. In the still picture data thus being read out, the number of scanning lines in the scanning line period in phase face to face is an even number, and the still picture reproduced by using the still picture data as reproduction signals presents normal image without color failure or the like.

Thus, in the magnetic tape recording and reproducing apparatus of the invention, the video signals for one field or two fields of the PAL system recorded in the magnetic tape after storing in the memory when recording as the still picture data are read out and stored in the memory when reproducing, and when the still picture data for one field are stored, the still picture data for one false field excluding the data of a specific scanning line section from the still picture data of one field are sequentially read out from the memory, or when the still picture data for two fields are stored, the still picture data for two fields are stored, and the still picture data for two false fields excluding the data of a specific scanning line section from the still picture data for two fields are sequentially read out from the memory. In the still picture data thus being read out, the number of scanning lines in the scanning line period in phase face to face is an even number, and the still picture reproduced by using the still picture data as reproduction signals presents normal image without color failure or the like.

The invention also presents a magnetic tape recording and reproducing apparatus for converting still picture data into digital signals, and recording and reproducing in a magnetic tape, comprising:

a memory possessing a capacity for storing the portion of one field of the video signals of PAL system for two fields composing one screen, means for recording by storing the video signals of the PAL system for one field in the memory as the still picture data at the time of recording, and recording into a magnetic tape while sequentially reading out from the memory, and means for reproducing by reading out the still picture data for one field from the magnetic tape at the time of reproduction and storing in the memory, repetitively reading out the still picture data of one field, and the still picture data for one false field excluding the data of a specific scanning section out of the still picture data sequentially from the memory, and producing the still picture data in which the number of scanning lines of the scanning line period in phase face to face is an even number as reproduction signals.

The invention further presents a magnetic tape recording and reproducing apparatus for converting still picture data into digital signals, and recording and reproducing in a magnetic tape, comprising:

a memory possessing a capacity for storing the portion of two fields of the video signals of the PAL system for two fields composing one screen, means for recording by recording the video signals of the PAL system for two fields in the memory as still picture at the time of recording, and recording into the magnetic tape while reading out sequentially from the memory, and means for reproducing by reading out the still picture data for two fields from the magnetic tape at the time of reproduction and storing in the memory, repetitively reading out the still picture data of the two fields, and the still picture data two false fields excluding the data in a specific scanning period of the still picture data sequentially from the memory, and producing the still picture data of which number of scanning lines of the scanning line period in phase face to face is an even number.

BRIEF DESCRIPTION OF THE DRAWINGS

Other and further objects, features, and advantages of the invention will be more explicit from the following detailed description taken with reference to the drawings wherein:

FIG. 1 including FIG. 1(1)-FIG. 1(4) is a waveform diagram for repetitive outputs of video signals of two screens, FIG. 2 is a block diagram showing a basic configuration of a magnetic tape recording and reproducing apparatus in an embodiment of the invention, FIG. 3 including FIG. 3(1)-FIG. 3(4) is a timing chart showing the operation of changeover switches 9, 14, FIG. 4 including FIG 4(1)-FIG. 4(4) is a timing chart showing the operation in recording, FIG. 5 including FIG. 5(1)-FIG. 5(3) is a timing chart showing the operation in reproducing, FIG. 6 including FIG. 6(1)-FIG. 6(3) is a waveform diagram showing the process of formation of false video signals in a magnetic tape recording and reproducing apparatus in an embodiment, FIG. 9 is a diagram showing the memory content of an image memory 8a.

DETAILED DESCRIPTION OF THE PREFERRED EMBODIMENTS

Figure 7:
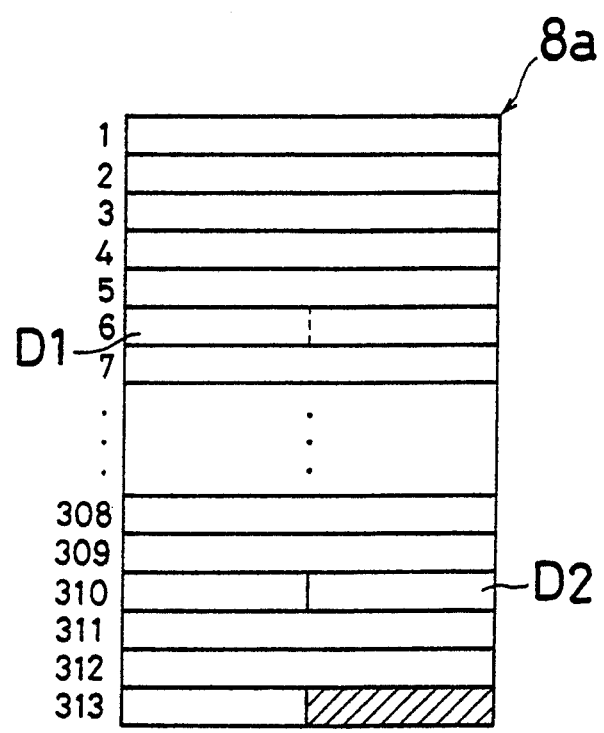
FIG. 7 is a diagram showing the memory content of an image memory 8a, FIG. 8 including FIG. 8(1)-FIG. 8(5) is a waveform diagram showing the process of formation of false video signals in a magnetic tape recording and reproducing apparatus in a different embodiment.

Now referring to the drawing, preferred embodiments of the invention are described below.

FIG. 2 is a block diagram showing a basic configuration of a magnetic tape recording and reproducing apparatus in an embodiment of the invention.

The magnetic tape recording and reproducing apparatus in the embodiment is a digital recording and reproducing apparatus capable of recording and reproducing in four-channel mode, in which two channels of the four channels are assigned for the sound signals, and the remaining two channels, for the video signals of PAL system.

In this case, two types of sound signals are fed in input terminals R0, L0. These input signals are fed into A/D converters 1, 2, respectively. In the A/D converters 1, 2, for example, at the sampling frequency of 32 kHz, the input analog sound signals are sampled, and converted, for example, into 12-bit digital sound signals d1, d2. The digital sound signals d1, d2 are fed from the A/D converters 1, 2 into a serial-parallel (S/P) converter 3, and fed into a data bus 4 parallel by every 8 bits, for example.

The video signal fed from an input terminal V0 is sent into an A/D converter 5, and is converted into a digital video signal d3. The A/D converter 5 samples the input analog video signal of PAL system at the sampling frequency of, for example, 17.7 MHz, converts it into an 8-bit digital signal d3, and feeds it parallel to a data bus 4.

The digital video signal d3 is written into one image memory 8a out of the image memories 8a, 8b connected to the data bus 4. The still picture of one screen portion is expressed by video signals for the period of one field of the video signals of PAL system, that is, the period of 1/50 sec. Therefore, it takes 1/50 sec to write the video signal d3 for one screen portion in the image memory 8a.

The digital sound signal d4 given to the data bus 4 from the S/P converter 3 is written into the other image memory 8b not used for memory of the digital video signal d3.

The digital sound signal d4 written in the image memory 8b is not read out until completion of the writing of the digital sound signal into all memory regions of the image memory 8b, and when storing in all memory regions is over, the digital sound signals stored before are sequentially read out and given to the data bus 4.

The digital sound signals read out into the data bus 4 in this way are given to a parallel-to-serial (P/S) converter 6, while the digital video signal stored in the image memory 8a is given to a P/S converter 7. Writing of digital video signal d3 and digital sound signal d4 into the image memories 8a, 8b, and reading from the image memories 8a, 8b are effected by a control circuit 12.

The digital sound signals serially led out from the P/S converter 6 are commonly given to input terminals 91, 92 of a changeover switch 9. The digital video signal being led out serially from the P/S converter 7 is given to an input terminal 93 of the changeover switch 9.

In the changeover switch 9, between its output terminal 94 and input terminals 91 to 93, as shown in FIG. 3, a sequential and cyclic conduction is formed by changeover control signals LR, LR1, and a digital signal d5 led out thus from the output terminal 94 is fed into a recording signal processor 10.

In the recording signal processor 10, for the input digital signal d5, addition of information called parity for correction of error, modulation or other processing is done, and the signal after such signal processing is recorded in a magnetic tape 11 by a rotary head (not shown).

When reproducing, the signal recorded in the magnetic tape 11 is given to a reproduction signal processor 13 from the rotary head. In the reproduction signal processor 13, error correction processing is done by referring to modulation and parity. Thus reproduced digital signal d6 is given to an input terminal 144 of a changeover switch 14.

In the changeover switch 14, its output terminals 141, 142 are connected respectively to D/A converters 15, 16. The changeover switch 14 conducts sequentially and cyclically between the input terminal 144 and output terminals 141 to 143, by changeover control signals LR, LR1 (see FIG. 3).

In this way, the D/A converters 15, 16 are provided with digital sound signals d7, d8 corresponding to the speakers located at the front right side and front left side of the listener, for example, and they are converted into analog sound signals in the D/A converters 15, 16, and are led out to the output terminals L1, R1 of the magnetic tape recording and reproducing apparatus.

At this time, the digital video signal d9 led out to the output terminal 143 from the input terminal 144 of the changeover switch 14 is given to the S/P converter 17, and is fed into the data bus 4 parallel by every 8 bits, for example. The digital video signal d10 thus entered is fed in either one of the image memories 8a, 8b. From the other one of the image memories 8a, 8b, at this time, the memory content is given from the data bus 4 to the D/A converter 18.

In the period of writing of digital video signal d10 into either one of the image memories, from the other image memory, the memory content is read out, and such reading processing is done cyclically.

As a result, at the output terminal V1 of the D/A converter 18, the video signals representing the still picture corresponding to the digital video signals stored in the other image memory are continuously led out.

Such video signals are fed into a display device, such as CRT (cathode ray tube), and the still picture is displayed on its display screen.

FIG. 4 is a timing chart showing the operation in recording. In this embodiment, the image memories 8a, 8b possess the memory capacity P capable of storing digital video signals corresponding to one field of video signals of the PAL system. Therefore, since the period of one field is 1/50 sec (FIG. 4(1)), the sampling frequency in the A/D converter 5 is 17.7 MHz, and the digital video signal d3 converted as being sampled in this way is an 8-bit digital video signal, the memory capacity P is expressed as follows.

Formula 1

$$P = 17.7 \text{ (MHz)} \times 8 \text{ (bits)} \times 1/50 \text{ (sec)}$$
$$= 2.83 \text{ (Mbits)}$$

On the other hand, the changeover control signal LR1 for controlling the changeover action of the changeover switch 9 has the frequency of 32 kHz, and a 24-bit digital video signal is read into the recorded signal processor 10 in the period of 1 cycle of the changeover control signal LR1, and hence the quantity of data R read out in 1 sec of the digital video signal recorded in the image memory 8a is as follows.

Formula 2

$$R = 32 \text{ (kHz)} \times 24 \text{ (bits)}$$
$$= 768 \text{ (kbits/sec)}$$

Therefore, in order that all of digital video signals, stored in the image memory 8a be read out in the recorded signal processor 10, the time of Formula 3

$$P/R = 3.68 \text{ (sec)}$$

should be required (FIG. 4(2)).

Hence, the video signal entered from the input terminal V0 is recorded in the magnetic tape 11 through the recorded signal processor 10 taking the time of Formula 4

$$3.68 \text{ (sec)} + 1/50 \text{ (sec)} \ 3.7 \text{ (sec)}$$

On the other hand, the sound signals entered from the input terminals R0, L0 are stored in the image memory 8b, but writing of the digital sound signal in the data quantity corresponding to the memory capacity P of the image memory 8b into the image memory 8b takes the time expressed in Formula 3, that is, the time of 3.68 sec (see FIG. 4(3)). In the image memory 8b, when the digital sound signals are written in all of the memory region, the digital sound signals are sequentially given to the P/S converter 6 to form the first written signals. Therefore, the digital sound signals led out from the P/S converter 6 into input terminals 91, 92 of the changeover switch 9 are delayed by about 3.7 sec from the sound signal supplied from the input terminals R0, L0 (see FIG. 4(4)).

In this way, in the magnetic tape 11, after recording of digital video signals, the digital sound signals corresponding to the recorded digital video signals are recorded. That is, the digital sound signals corresponding to the digital video signals are recorded in the magnetic tape 11 with a delay of about 3.7 sec from the digital video signals.

FIG. 5 shows a timing chart of the operation in recording. The operation in reproduction is explained below. The signal read out from the magnetic tape 11 by a rotary head or the like is given to a reproduction signal processor 13, and is led out from here bit by bit serially. In this way, the digital sound signal d6 is given to the D/A converter 15 as digital sound signal d7, and is given to the D/A converter 16 as digital sound signal d8, while in another period is given at digital video signal d9 to the S/P converter 17.

The digital video signals d10 produced from the S/P converter 17 are sequentially written in, for example, one image memory 8a. Writing of digital video signals for one field into the image memory 8a is terminated in the same time as required in reading of the digital video signals from the image memory 8a into the recorded signal processor 10 (see FIG. 5(1)).

In this way, when writing of digital video signals for one screen is over, as shown in FIG. 5(2), all digital video signals, that is, digital video signals for one field are read out from the image memory 8a finishing the writing process, and of the digital video signals of one field, without selectively reading only the data corresponding to a specific scanning line period, continuous reading of the remaining data is repeated. That is, the digital video signal for one field written in the image memory 8a, and the still picture data of one false field excluding the false digital video signals for approximating one field are sequentially read out from the image memory 8a repetitively, and the digital video signals thus read out are fed into the D/A converter 18.

The sound signal is reproduced and delivered in about 3.7 sec after start of reproduction of video signals as shown in FIG. 5(3).

In this case, repetition of reading of digital video signal d10 into the image memory 8a, and alternate reading of digital video signal and false digital signal from the image memory 8a is controlled by the control circuit 12.

FIG. 6 is a waveform diagram showing the relation between the digital video signals for one field read out from the image memory 8a at the time of reproducing and the false digital video signals, and FIG. 7 is a diagram showing the memory content in the image memory 8a. In FIG. 6, for the simplicity of explanation, the waveform of the video signal before digitizing is shown. That is, in the diagram, as the digital video signals for one field to be recorded in the image memory 8a, the video signals of the first field of the video signals of the two fields for composing one screen are selected, and among the video signals of the first field, the signals excluding the data in a specific scanning line period mentioned later correspond to the false digital video signals mentioned above. Especially in FIG. 6(2), the waveform shows from the last portion of the video signal of the false first field to the first portion of the video signal of the next first field, while FIG. 6(3) shows the waveform from the last portion of the video signal of the first field to the first portion of the video signal of the next false first field. FIG. 6(1) denotes the repetition waveform of the video signal of the first field shown to explain the process of obtaining the video signals of the false first field excluding the data of a specific scanning line period from the video signals of the first field.

The waveform in FIG. 6(1) corresponds to the waveform of writing the video signals of the first field into the image memory 8a, and reading them out repeatedly to produce the still picture data, and at this time the number of scanning lines of the same phase that exists face to face across or on either side of the vertical synchronizing signal portion, that is, the number of scanning lines from the 309th scanning line to the seventh scanning line is 10.5, which is not an even number. Accordingly, in this state, the still picture reproduced by using this still picture data has a color failure, and an appropriate color still picture is not obtained.

By contrast, the video signals in the false first field have the waveform with the exception of the portions indicated by codes T1, T2 in FIG. 6(1), that is, the front half portion (data D1 in FIG. 7) of the sixth scanning line in the first field, and the second half portion (data D2 shown in FIG. 7) of the 310th scanning line.

As a result, in FIG. 6(2) showing the portion linking the rear portion of the video signals of the false first field and the front portion of the video signals of the first field across the vertical synchronizing signal portion, the number of scanning lines of the same phase occurring on either side of a vertical synchronizing portion, that is, the number of scanning lines from the 309th scanning line to the sixth scanning line is 10, which is an even number.

Likewise, in FIG. 6(3) showing the portion linking the rear portion of the video signals of the first field and the video signals of the false first field across the vertical synchronizing signal portion, the number of scanning lines in phase face to face, that is, the number of scanning lines from the 309th scanning line to the sixth scanning line is also 10, which is an even number.

Therefore, in this embodiment in which the digital video signals for one field and false digital video signals are alternately produced from the image memory 8a as reproduction signals, an adequate still picture may be reproduced without color failure in the reproduced color still picture.

Meanwhile, the total number of scanning lines in the false first field is

Formula 5

$$312.5 - (0.5 \times 2) = 311.5$$

and as compared with the number of scanning lines in the first field of 312.5 lines, it is smaller by Formula 6

$$1/(312.5) = 0.32\ (\%)$$

but this rate is sufficiently small, and since the portion not produced in the video signals in the false first field is selected in the burst lack period, the original image information is not sacrificed.

Figure 8:
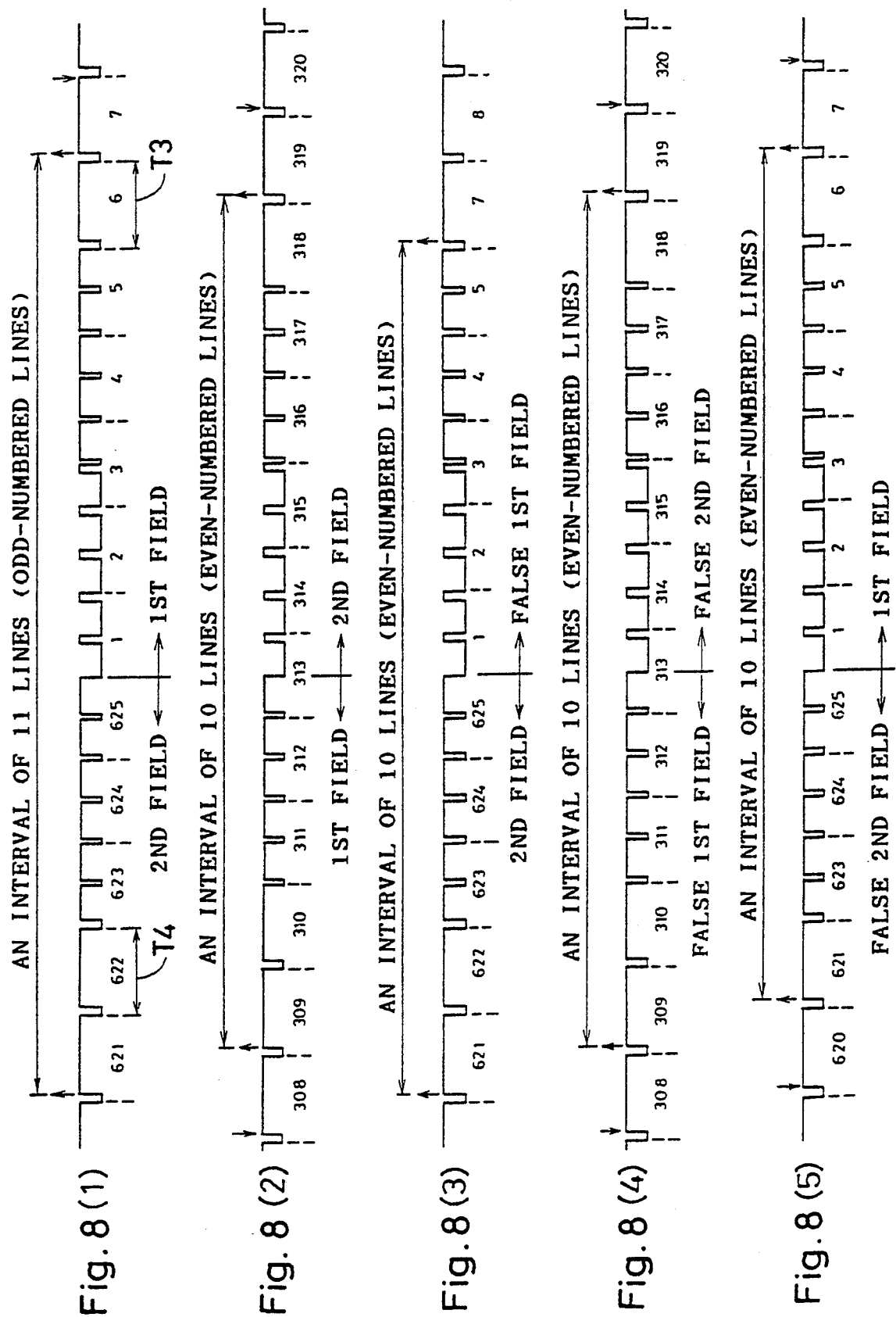
Figure 9:
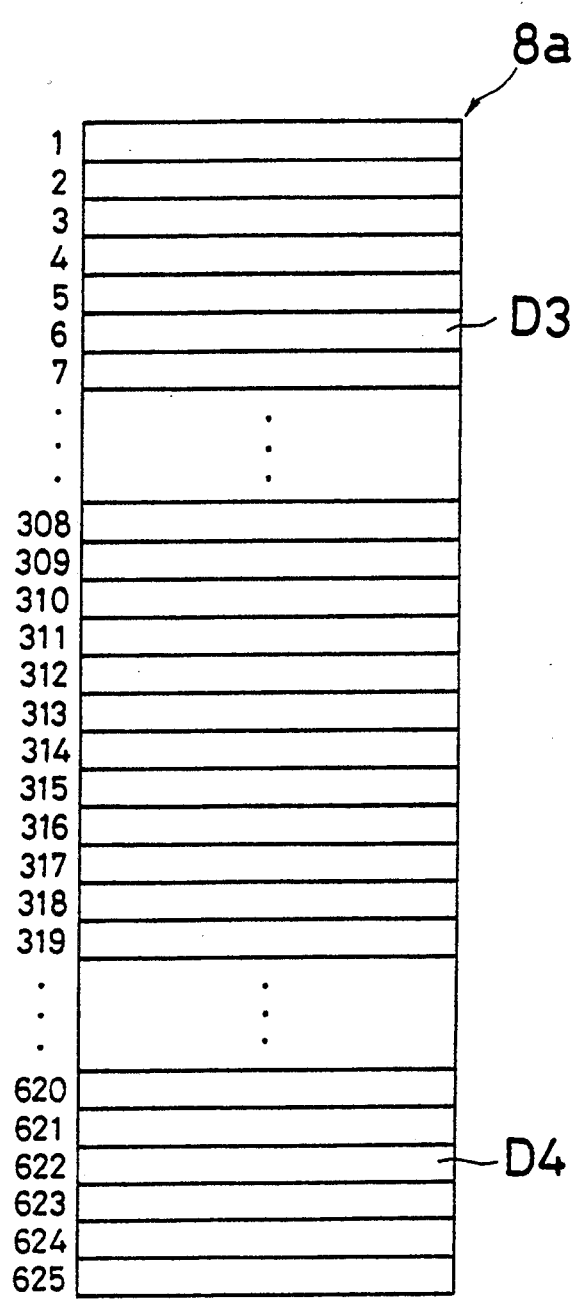

FIG. 8 is a waveform diagram showing the relation between the digital video signals for two fields and false digital video signals read out from the image memory 8a at the time of reproducing in another embodiment, and FIG. 9 is a diagram showing the memory content of the image memory 8a. In FIG. 8, too, to simplify the explanation, the waveform of the video signal before digitizing is shown. That is, in this embodiment, as the image memories 8a, 8b, those having the memory capacity for two fields composing one screen are used, and the digital video signals for two fields for composing one screen are written in the image memories when recording and reproducing.

Additionally, at the time of reproducing, for example, after the digital video signals of two fields written in the image memory 8a are read out, the digital video signals of two false fields excluding the data in the specific scanning line period of the digital video signals of the two fields are read out, and this reading action is alternately repeated.

In FIG. 8, as the video signals for two fields, the scanning signals of the first field and second field are selected, and of the video signals of the first field, the signals excluding the data in the specific scanning line period mentioned later, that is, the video signals of false first field, and of the video signals of the second field, the signals excluding the data of the specific scanning line period described later, that is, the video signals of the false second field correspond to the digital video signals of the two false fields mentioned above. In particular, in FIG. 8(3), the waveform shows from the rear portion of the video signals of the second field to the front portion of the video signals of the next false first field, FIG. 8(4) shows the waveform from the rear portion of the video signals of the false first field to the front portion of the video signals of the next false second field, and FIG. 8(5) shows the waveform from the rear portion of the video signals of the false second field to the front portion of the video signals of the next first field.

Meanwhile, FIG. 8(1) and FIG. 8(2) represent the repetitive waveforms of video signals of the first field and second field shown to explain the process of obtaining the video signals of the false first field and the video signals of the false second field by excluding the data in the specific scanning line period from the video signals of the first field and second field.

The waveforms in FIG. 8(1) and FIG. 8(2) correspond to the waveforms for writing the video signals of the first field and second field in, for example, the image memory 8a at the time of reproducing, and producing them as still picture data by reading out repetitively. Of them, in the waveform shown in FIG. 8(2) from the rear portion of the video signals of the first field to the front portion of the video signals of the next second field across the vertical synchronizing signal portion, the number of scanning lines in phase face to face or of the same phase existing across the vertical synchronizing signal portion, that is, the number of scanning lines from the 309th scanning line to the 319th scanning line is 10, which is an even number, but in the waveform shown in FIG. 8(1) from the rear portion of the video signals of the second field to the front portion of the next first field across the vertical synchronizing signal portion, the number of scanning lines in phase face to face across the vertical synchronizing signal portion, that is, the number of scanning lines from the 621st scanning line to the seventh scanning line is 11, which is an odd number. Hence, in this state, color failure or other defect is involved in the still picture reproduced by using such still picture data, and normal color still picture is not obtained.

By contrast, the video signals in the false first field have the waveform excluding the portion indicated by code T3 in FIG. 8(1), that is, the sixth scanning line portion (data D3 shown in FIG. 9) in the first field, and the video signals in the false second field have the waveform excluding the portion indicated by code T4 in FIG. 8(1), that is, the 622nd scanning line portion (data D4 in FIG. 9) in the second field.

As a result, in FIG. 8(3) showing the portion linking the rear portion of the video signals of the second field across the vertical synchronizing signal portion and the front portion of the video signals of the next false first field, the number of scanning lines in phase face to face, that is, the number of scanning lines between the 621st scanning line and the seventh scanning line is 10, that is, an even number, and in FIG. 8(5) showing the portion linking the rear portion of the video signals of the false second field across the vertical synchronizing signal portion and the front portion of the video signals of the next first field, the number of scanning lines in phase face to face, that is, the number of scanning lines between the 621st scanning line and the seventh scanning line is also 10, that is, an even number. Furthermore, FIG. 8(4) showing the portion linking the rear portion of the video signals of the false first field and the front portion of the video signals of the next false second field is the same as the portion linking the rear portion of the video signals of the first field and the front portion of the video signal of the next second field shown in FIG. 8(2), and therefore, the number of scanning lines in phase face to face, that is, the number of scanning lines between the 309th scanning line and the 319th scanning line is also 10, which is an even number.

Therefore, in this embodiment wherein digital video signals for two fields and digital video signals for two false fields are alternately delivered from the image memory 8a as reproduction signals, an appropriate still picture may be reproduced without causing color failure or the like in the color still picture to be reproduced.

The total number of scanning lines of the video signals in the false first field and false second field is both 311.5, one less than the normal number (312.5 lines), which does not sacrifice the image information.

In the foregoing embodiments, meanwhile, practical examples of specific scanning period are shown when obtaining false video signals by deleting data in the specific scanning line period from the initial video signals, but not limited to the shown scanning line period, other scanning line periods may be selected as far as the same purpose is achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and al changes which come within the meaning and the range of equivalency of the claims are therefore intended to be embraced therein.

What is claimed is:

1. A magnetic tape recording and reproducing apparatus for recording and reproducing digital signals of still picture data by using a magnetic tape as a recording medium, comprising:

a memory possessing a capacity for storing a portion of either one field or two fields of received video signals in which two fields compose one screen, means for recording by storing the video signals of a still picture of a PAL system for said portion of either one field or two fields in said memory, and then recording in the magnetic tape the stored signals by reading out sequentially from said memory, and means for reproducing by reading out the recorded still picture data of either the one field or two fields from the magnetic tape when reproducing and storing said data in the memory, and means for repeatedly reading out from said memory in a sequential manner the still picture data of said one field, along with the still picture data of one false field of said one field which excludes the data of a specific scanning line section of said one field out of the still picture data, if the recorded still picture data are from one field or, if the recorded still picture data are for said two fields, repeatedly reading out from the memory in a sequential manner the still picture data of said two fields, and the still picture data of two false fields of said two fields which exclude the data of specific scanning line sections expression of said two fields out of the still picture data, if the recorded still picture data are for said two fields and producing as reproduction signals the still picture data in which the number of scanning lines in a scanning line period that are in phase and occur on either side of a vertical synchronizing signal portion of said still picture data is an even number.

2. An apparatus as in claim 1 wherein said memory includes means for storing audio signals associated with said still picture, said means for recording includes means for recording said audio signals stored in said means for storing into said magnetic tape and said means for reproducing includes means for repetitively reading out said audio signals from the magnetic tape.

3. An apparatus as in claim 2 wherein said audio signals are recorded in the magnetic tape subsequent to the recording of the video signals associated with said still picture.

4. An apparatus as in claim 1 wherein said memory includes two image memory means and said reproducing alternatively stores said still picture data in one of said image memory means while the other said image memory means reads out said reproduction signals.

5. A magnetic tape recording and reproducing apparatus for converting received PAL system video signals of still picture data into digital signals, and recording and reproducing on a magnetic tape, comprising:

a memory possessing a capacity for storing a portion of one field of the PAL system video signals in which two fields compose one screen, means for recording by storing the PAL system video signals for said one field in the memory as the still picture data, and recording the stored still picture data onto the magnetic tape while sequentially reading out from the memory, and means for reproducing by reading out the still picture data for said one field from the magnetic tape and storing said one field in the memory, and means for repetitively reading out from said memory the still picture data of said one field, and the still picture data for one false field of said one field which excludes the data of a specific scanning line section of said one field out of the still picture data, and said means for repetitively reading out producing still picture data in which the number of scanning lines of a scanning line period that are in phase and occur across a vertical synchronizing signal is an even number.

6. A magnetic tape recording and reproducing apparatus for converting received PAL system video signals of still picture data into digital signals, and recording and reproducing said digital signals on a magnetic tape, said apparatus comprising:

a memory possessing a capacity for storing a portion of two fields of the PAL system video signals in which two fields compose one screen;

means for recording by storing the PAL system video signals for said two fields in the memory as a still picture, and recording the stored still picture onto the magnetic tape while reading out sequentially from the memory, and means for reproducing by reading out the still picture data for said two fields from the magnetic tape and storing said two fields in the memory, means for repetitively reading out the still picture data of said two fields, and the still picture data for two false fields of said two fields which exclude the data in a specific scanning period of said two fields of the still picture data, and said means for repetitively reading out producing still picture data of which the number of scanning lines of the scanning line period that are in phase and occur across a vertical synchronizing signal is an even number.

* * * * *